Sept. 9, 1924.
A. G. BROUSE
TURBINE BEARING
Filed April 20, 1923
1,507,575
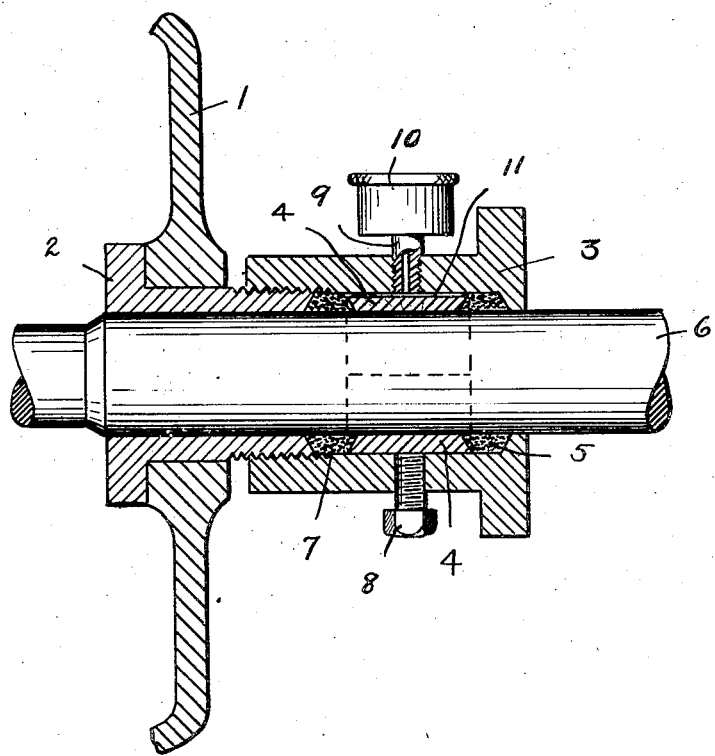
Inventor
Allen G. Brouse,
Geo. Stevens.
Attorney Patented Sept. 9, 1924.

1,507,575

UNITED STATES PATENT OFFICE.

ALLEN G. BROUSE, OF DULUTH, MINNESOTA.

TURBINE BEARING.

Application filed April 20, 1923. Serial No. 633,365.

*To all whom it may concern:*

Be it known that I, ALLEN G. BROUSE, a citizen of the United States, residing at Duluth, in the county of St. Louis and State of Minnesota, have invented certain new and useful Improvements in Turbine Bearings, of which the following is a specification, reference being had therein to the accompanying drawing.

This invention relates to shaft bearings and has special reference to a bearing particularly adapted for use upon what are known as turbine generator sets; that is small electric generator sets which are used on locomotives, the turbine receiving its energy from steam.

The object of my present invention is to provide a more durable and efficient combination bearing and stuffing gland for such shafts.

Other objects and advantages of the peculiar construction will appear in the further description of the invention.

Referring to the accompanying drawing, in which like letters of reference indicate like parts, the same is a vertical sectional view through one of the bearings as applied to the turbine casing of such a generator set.

1 represents the head of the turbine case housing and 2 the bushing or sleeve which extends horizontally through the head of the case and is securely attached thereto in any desired manner. This sleeve ordinarily extends slightly beyond the end of the case, is externally screw threaded, and receives the ordinary packing nut thereupon. In this manner a combination stuffing joint and bearing is provided, but in practice it is found that the bearing is not only inadequate for the purpose intended, but the stuffing joint requires a great deal of attention to prevent its leaking and otherwise becoming inefficient.

In overcoming these objectionable features I provide an abnormally elongated stuffing nut 3 which is screw threadedly attached to the exterior of the sleeve 2, but within the cylinder of the packing nut 3. I install a two-part or split bushing bearing 4, the ends of which are beveled to properly receive packing, similar to an ordinary stuffing box joint.

However before installing the split bushing within the cylinder of the packing nut 3, a suitable packing 5 is placed within the outermost end of said nut, so that when the bushing 4 is subsequently placed therein the space between the end thereof and the outermost end of the nut becomes packed, it being understood, of course, that the packing nut at this time surrounds the shaft 6 which transmits the power from the turbine to the generator.

Then a similar packing 7 is put about the shaft into the nut 3 when the latter is screwed into position upon the sleeve 2 as shown in the drawings.

As a means for holding the lower half of the split bushing 4 in position I provide a common set screw 8, threaded through the cylinder of the packing nut, and the stem 9 of the grease cup 10 performs a similar function in respect to the upper half of the bushing 4. This half of the bushing 4 is provided with a longitudinal groove 11 the entire length of its circumferential face as a means for conducting the lubricant from the grease cup to either end of the bushing 4 so as to insure proper lubrication thereof.

From the foregoing it is evident that I have provided double packing efficiency of the bearing in that there are two spaced packing joints, one at either end of the split bushing 4 and that there is also added this auxiliary bearing feature to the single bearing commonly used.

In practice this assembly has proven very efficient requiring much less attention than the ordinary bearing in such mechanisms.

Having thus described my invention what I claim and desire to secure by Letters Patent is:

A shaft bearing comprising in combination a support, a journal sleeve extending through the support and non-rotatable therein, said sleeve being externally screw threaded upon one end thereof which protrudes beyond the support, an elongated packing nut screw threadedly mounted upon the sleeve, a split auxiliary sleeve within the nut and normally spaced from both ends thereof forming spaced annular packing spaces, packing within said spaces adjustably held therein by the reciprocation of the nut, and means cooperatively connected with one half of the split sleeve for simultaneously supplying lubricant to the packing at both ends thereof.

In testimony whereof I hereunto affix my signature.

ALLEN G. BROUSE.

Witnesses:
SAMUEL O. DICK,
GEORGE W. BOUTIN.